United States Patent
Li et al.

(10) Patent No.: US 10,306,652 B2
(45) Date of Patent: May 28, 2019

(54) FEEDBACK INTERFERENCE MANAGEMENT IN SIDELINK

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/680,052

(22) Filed: Aug. 17, 2017

(65) Prior Publication Data
US 2018/0234980 A1    Aug. 16, 2018

Related U.S. Application Data

(60) Provisional application No. 62/457,270, filed on Feb. 10, 2017.

(51) Int. Cl.
*H04W 72/08*    (2009.01)
*H04W 72/04*    (2009.01)
(Continued)

(52) U.S. Cl.
CPC ........ *H04W 72/082* (2013.01); *H04L 1/1854* (2013.01); *H04L 1/1861* (2013.01); *H04W 72/0473* (2013.01); *H04W 72/10* (2013.01); *H04W 74/0816* (2013.01); *H04L 25/0202* (2013.01); *H04L 2001/0093* (2013.01)

(58) Field of Classification Search
CPC .......... H04W 72/082; H04W 72/0473; H04W 72/10; H04L 1/1854; H04L 1/1861
See application file for complete search history.

(56) References Cited

U.S. PATENT DOCUMENTS

| 8,824,326 B2 | 9/2014 | Wang et al. |
| 9,549,411 B2 | 1/2017 | Miao et al. |

(Continued)

FOREIGN PATENT DOCUMENTS

EP    1768441 A2    3/2007

OTHER PUBLICATIONS

International Search Report and Written Opinion—PCT/US2018/013345—ISA/EPO—dated Apr. 20, 2018.

*Primary Examiner* — Christopher M Brandt
(74) *Attorney, Agent, or Firm* — Haynes and Boone, LLP

(57) ABSTRACT

Wireless communications systems and methods related to managing interference among feedback transmissions are provided. A first wireless communication device receives, from a second wireless communication device, a first forward data transmission request signal over a first link in a first link direction, wherein the first forward data transmission request signal is associated with a first feedback transmission over the first link in a second link direction opposite the first link direction. The first wireless communication device yields, in response to the first forward data transmission request signal, access to a channel resource for the first feedback transmission based on at least an interference tolerance level of the second wireless communication device and an interference level on the first feedback transmission from the first wireless communication device.

30 Claims, 10 Drawing Sheets

(51) Int. Cl.
*H04W 72/10* (2009.01)
*H04L 1/18* (2006.01)
*H04W 74/08* (2009.01)
H04L 25/02 (2006.01)
H04L 1/00 (2006.01)

(56) References Cited

U.S. PATENT DOCUMENTS

| | | |
|---|---|---|
| 2009/0016263 A1 | 1/2009 | Kishigami et al. |
| 2015/0264696 A1* | 9/2015 | Miyata .............. H04W 52/0258 370/336 |
| 2015/0271862 A1 | 9/2015 | Lee |
| 2016/0113050 A1 | 4/2016 | Li et al. |
| 2016/0338078 A1 | 11/2016 | Wang et al. |

* cited by examiner

US 10,306,652 B2

FEEDBACK INTERFERENCE MANAGEMENT IN SIDELINK

CROSS REFERENCE TO RELATED APPLICATIONS

The present application claims priority to and the benefit of the U.S. Provisional Patent Application No. 62/457,270, filed Feb. 10, 2017, which is hereby incorporated by reference in its entirety as if fully set forth below and for all applicable purposes.

TECHNICAL FIELD

The technology discussed in this disclosure relates generally to wireless communication systems, and more particularly to managing interference among feedback transmissions over sidelinks. Embodiments enable and provide solutions and techniques for network nodes to reduce retransmissions over sidelinks caused by corrupted feedbacks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple wireless communication devices, which may be otherwise known as user equipment (UE).

In a wireless network, a BS may allocate resources for communication with UEs. However, there is a growing demand for peer-to-peer communication between UEs. To facilitate peer-to-peer communications, a portion of the resources, for example, certain time periods and/or certain frequency resources, may be allocated for the peer-to-peer communications. The communication link between a pair of UEs is referred to as a sidelink. The resources reserved for the peer-to-peer communication may be referred to as sidelink resources.

One approach to allowing multiple pairs of UEs to share sidelink resources for peer-to-peer or sidelink communications is to employ medium-sensing procedures, such as listen-before-talk, where request-to-send (RTS) signals and clear-to-send (CTS) signals may be exchanged prior to data transmissions. Current RTS-CTS-based medium sensing procedures are designed for protecting data transmissions in a single direction. However, sidelink communications can include data transmissions in a forward link direction and feedback transmissions in a reverse link direction. Interference can occur to the data transmissions and/or the feedback transmissions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

While multiple transmitter-receiver pairs may share communication resources based on medium sensing and access priorities, procedures for managing interference in both forward link direction and reverse link direction may be desirable. Embodiments of the present disclosure provide mechanisms for wireless communication devices to improve resource sharing efficiency and communication performance by considering interference on feedback transmissions (e.g., acknowledgements (ACKs) or not-ACKs (NAKs)) in addition to interference on forward data transmissions. To protect a feedback transmission over a priority link, a low-priority receiver may consider an interference tolerance level of a priority transmitter and an interference level from the low-priority receiver to the priority transmitter.

For example, in an aspect of the disclosure, a method of wireless communication includes receiving, by a first wireless communication device from a second wireless communication device, a first forward data transmission request signal over a first link in a first link direction, wherein the first forward data transmission request signal is associated with a first feedback transmission over the first link in a second link direction opposite the first link direction; and yielding, by the first wireless communication device in response to the first forward data transmission request signal, access to a channel resource for the first feedback transmission based on at least an interference tolerance level of the second wireless communication device and an interference level on the first feedback transmission from the first wireless communication device.

In an additional aspect of the disclosure, an apparatus includes a receiver configured to receive, from a second wireless communication device, a first forward data transmission request signal over a first link in a first link direction, wherein the first forward data transmission request signal is associated with a first feedback transmission over the first link in a second link direction opposite the first link direction; and a processor configured to yield, in response to the first forward data transmission request signal, access to a channel resource for the first feedback transmission based on at least an interference tolerance level of the second wireless communication device and an interference level on the first feedback transmission from the first wireless communication device.

In an additional aspect of the disclosure, a computer-readable medium having program code recorded thereon, the program code includes code for causing a first wireless communication device to receive, from a second wireless communication device, a first forward data transmission request signal over a first link in a first link direction, wherein the first forward data transmission request signal is associated with a first feedback transmission over the first link in a second link direction opposite the first link direction; and code for causing the first wireless communication device to yield, in response to the first forward data transmission request signal, access to a channel resource for the first feedback transmission based on at least an interference tolerance level of the second wireless communication device and an interference level on the first feedback transmission from the first wireless communication device.

In an additional aspect of the disclosure, an apparatus includes means for receiving, from a second wireless communication device, a first forward data transmission request signal over a first link in a first link direction, wherein the first forward data transmission request signal is associated with a first feedback transmission over the first link in a second link direction opposite the first link direction; and means for yielding, in response to the first forward data transmission request signal, access to a channel resource for the first feedback transmission based on at least an interference tolerance level of the second wireless communication device and an interference level on the first feedback transmission from the first wireless communication device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, such exemplary embodiments can be implemented in various devices, systems, and methods.

DETAILED DESCRIPTION

Figure 1:
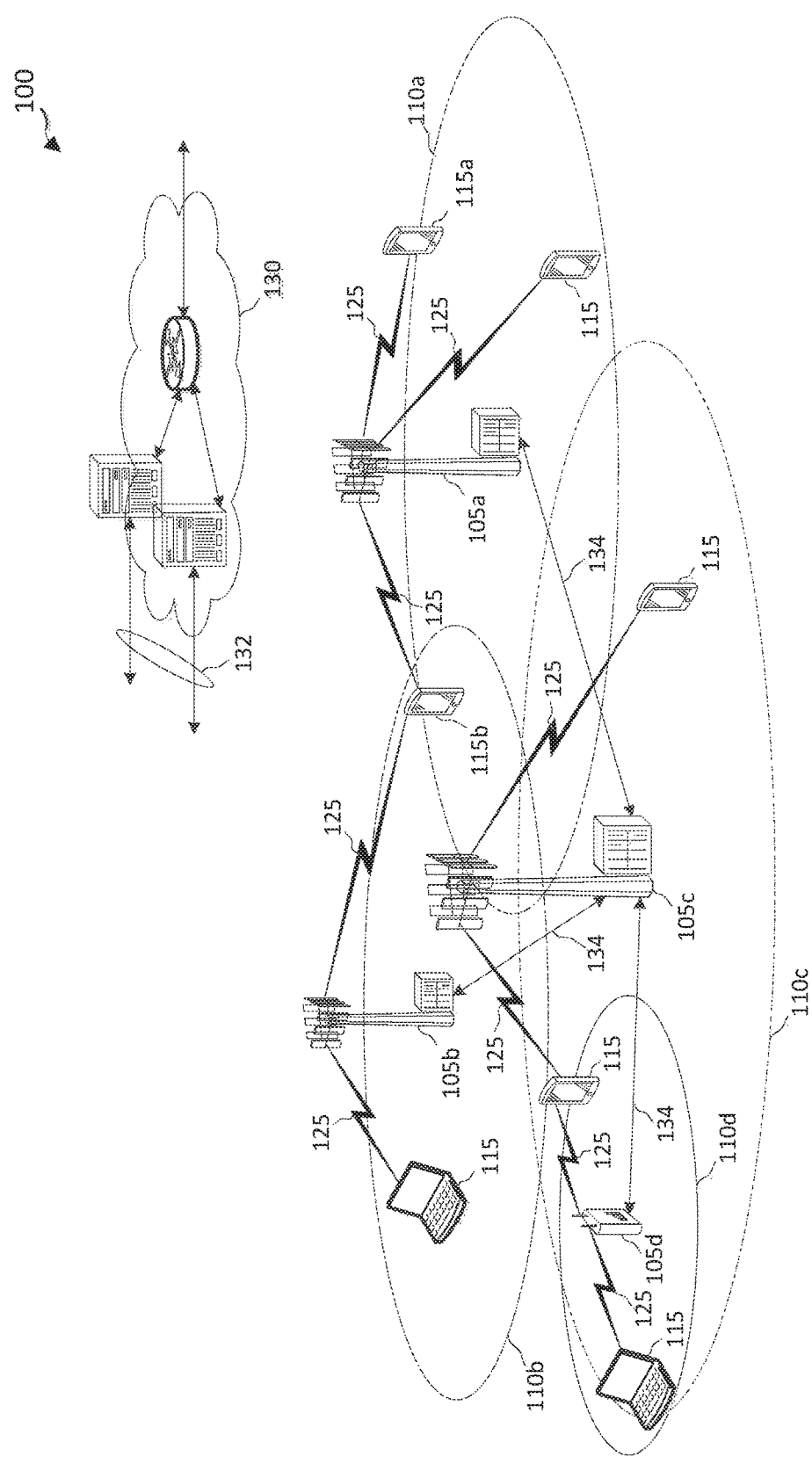
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes interference management in sidelinks. In a wireless network, a portion of resources can be allocated for unicast peer-to-peer or sidelink communications between one or more pairs of wireless devices. Multiple pairs of wireless devices may contend for the allocated sidelink resources for peer-to-peer communications based on priorities. For example, a first pair of wireless devices over a first link may be assigned with a higher access priority than a second pair of wireless devices over a second link. In each pair of wireless devices, one wireless device may be a transmitter and the other wireless device may be a receiver. The transmitter may transmit data to the receiver in a forward link direction. The receiver may respond to the data by transmitting a feedback to the transmitter in a reverse link direction. Thus, interference management may consider interference in both the forward link direction and the reverse link direction. In an embodiment, to protect a feedback transmission over a priority link, a low-priority receiver may determine whether to yield to the priority link based on an interference tolerance level of a priority transmitter of the priority link and an interference level from the low-priority receiver to the priority transmitter. By considering interference on the feedback transmissions, the disclosed embodiments can reduce retransmissions over sidelinks due to corrupted feedbacks, and thus may improve resource utilization efficiency. While the disclosed embodiments are illustrated in the context of sidelink communications, the disclosed embodiments may be applied to any communication over a shared medium. In addition, the disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data.

In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. An UL-centric subframe may include a longer duration for UL communication than DL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical hybrid-automatic request indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

Figure 2:
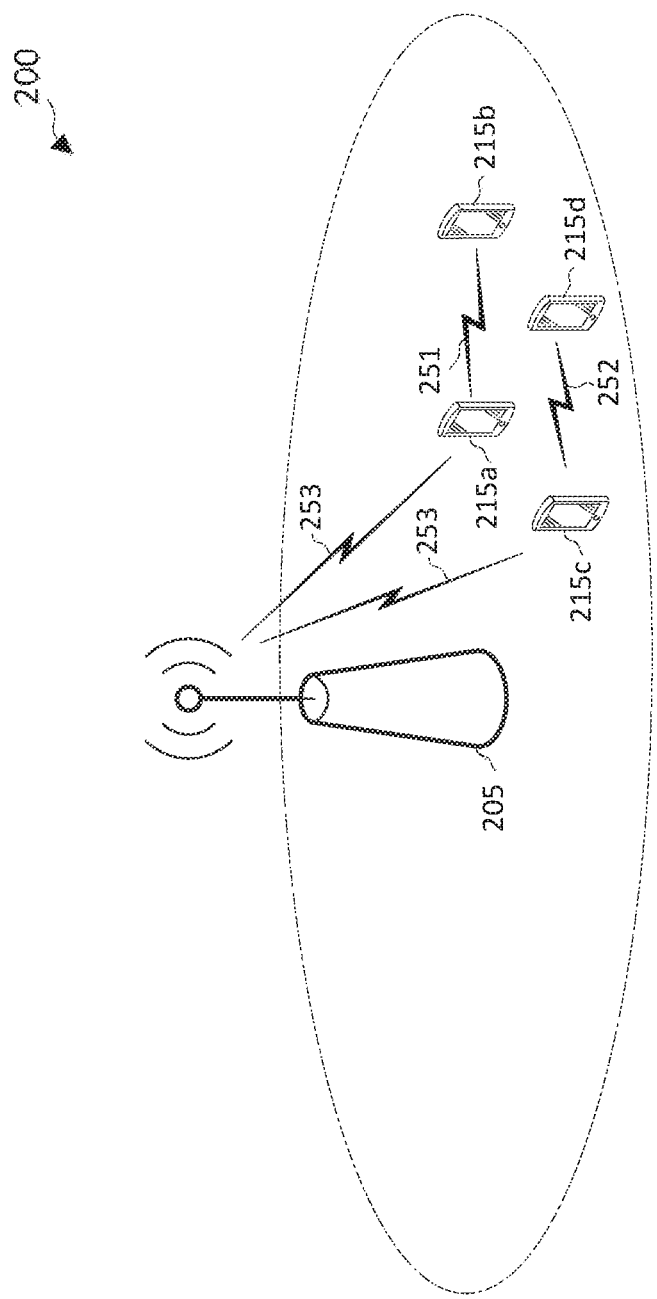
FIG. 2 illustrates an example of a wireless communications network that provisions for sidelink communications according to embodiments of the present disclosure.

FIG. 2 illustrates an example of a wireless communication network 200 that provisions for sidelink communications according to embodiments of the present disclosure. The network 200 may be similar to the network 100. FIG. 2 illustrates one BSs 205 and four UEs 215 for purposes of simplicity of discussion, though it will be recognized that embodiments of the present disclosure may scale to many more UEs 215 and/or BSs 205. The BS 205 and the UEs 215 may be similar to the BSs 105 and the UEs 115, respectively. The BSs 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another side link 252. The sidelinks 251 and 252 are unicast bidirectional links. Some of the UEs 215 (e.g., the UEs 215a and 215c) may also communicate with the BS 205 via communication links 253 (e.g., including uplink and downlink) similar to the communication links 125. The peer-to-peer communications may include forward data transmissions over the sidelinks 251 and 252 in a forward link direction and feedback transmissions over the sidelinks 251 and 252 in a reverse link direction, as described in greater detail herein.

To provision for sidelink or peer-to-peer communications, the BS 205 may reserve or pre-configure a portion of resources (e.g., time and frequency resources) for the sidelink or peer-to-peer communications. The BS 205 may communicate the sidelink resource configuration to the UEs 215. In some embodiments, the sidelink resources may be shared among the UEs 215. The UEs 215 or the sidelinks 251 and 252 may be assigned with priorities for accessing the sidelink resources. The UEs 215 may exchange RTS signals and/or CTS signals to contend for the sidelink resources. For example, the sidelink 251 may have priority over the sidelink 252 in a particular time period. Thus, the UEs 215c and 215d may listen to the channel for RTS and/or CTS signals from the UEs 215a and 215b and determine whether to yield access to the sidelink 251 during the time period based on the channel listening. The handshakes and/or the yielding mechanisms for sharing the sidelink resources are described in greater detail herein.

Figure 3:
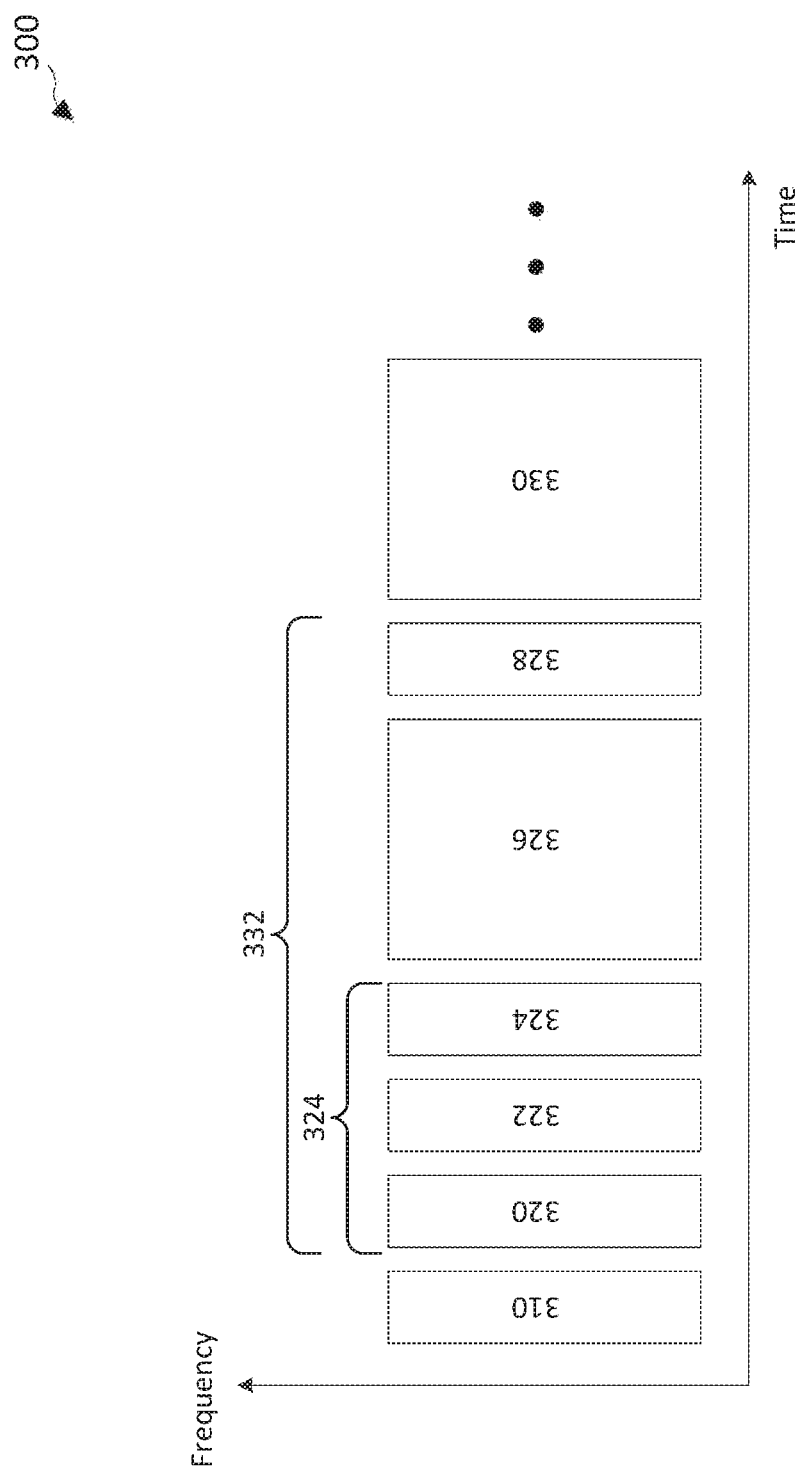
FIG. 3 illustrates a sidelink-centric unicast subframe according to embodiments of the present disclosure

FIG. 3 illustrates a sidelink-centric unicast subframe 300 according to embodiments of the present disclosure. The x-axis represents time in some constant units. The y-axis represents frequency in some constant units. The subframe 300 can be used by the BSs 105 and 205 and the UEs 115 and 215 for communications when operating in a TDD mode. The subframe 300 includes a DL control period 310, a sidelink period 332, and a UL common burst period 330 separated by time gaps. The DL control period 310 is designated for a BS to transmit DL control information. The sidelink period 332 is designated for UEs to communicate in a peer-to-peer communication mode. The UL common burst period 330 is designated for UEs to transmit UL data to a serving BS.

The DL control period 310 may be referred to as a physical downlink control channel (PDCCH) period. A BS may transmit one or more sidelink transmission grants and/or UL transmission grants in the DL control period 310, for example, via frequency-division multiplexing (FDM). A sidelink transmission grant may be non-link-specific, for example, for any pair of UEs to communicate during the sidelink period 332 based on priorities. Alternatively, a sidelink transmission grant may be link-specific, for example, for a particular pair of UEs to communicate during the sidelink period 332. A UL transmission grant may include scheduling information for a UE to communicate with the BS during the UL common burst period 330.

The sidelink period 332 includes a channel sensing period 334, a sidelink regular burst period 326, and a sidelink feedback period 328 separated by time gaps. The channel sensing period 334 includes RTS periods 320 and 322 and a CTS period 324. The RTS periods 320 and 322 are designated for RTS signal transmissions by a primary device and a secondary device, respectively. A RTS signal may indicate a request to transmit data during the sidelink regular burst period 326. A RTS signal may include a destination identifier (ID), a transmission duration, and a reference signal to facilitate channel measurements and/or yielding, as described in greater detail herein. A primary device (e.g., the UE 215a) may correspond to a transmitter of a priority link (e.g., the sidelink 251). A secondary device (e.g., the UE 215a) may correspond to a transmitter of a low-priority link (e.g., the sidelink 252). For example, the secondary device may listen to the channel during the RTS period 320. When no RTS signal is detected from the primary device, the secondary device may send a RTS signal in the RTS period 322.

The CTS period 324 is designated for a CTS signal transmission by a target receiver corresponding to the destination ID of a RTS signal transmitted in the RTS period 320 or 322. A CTS signal is a response to a RTS signal, for example, to grant a transmission request. A CTS signal may include a source ID (e.g., of the target receiver), a transmission duration, a signal-to-noise-plus-interference ratio (SINR) of a received RTS signal and/or a reference signal to facilitate channel estimation and transmit yielding, as described in greater detail herein.

The sidelink regular burst period 326 is referred to as a physical sidelink shared channel (PSSCH) period. The sidelink regular burst period 326 is designated for data transmission by UEs in peer-to-peer communication. The sidelink data may be transmitted using a modulation coding scheme (MCS) determined based on a CTS signal received during CTS period 324. For example, the CTS signal may include a channel quality indicator (CQI).

The sidelink feedback period 328 is referred to as a physical sidelink hybrid-automatic request indicator channel (PSHICH) period. The sidelink feedback period 328 is used by a target receiver to transmit a feedback (e.g., a HARQ acknowledgement (ACK) or a HARQ not-ACK (NAK)) to indicate the reception status of the data received during the sidelink regular burst period 326. The unicast sidelink communication mechanisms are described in greater detail herein. While the subframe 300 is illustrated with two RTS periods 320 and 322 serving two sidelinks, the subframe 300 may be configured to serve any suitable number of sidelinks and may allocate time-division multiplexing (TDM) and/or FDM resources for RTS transmissions.

Figure 4:
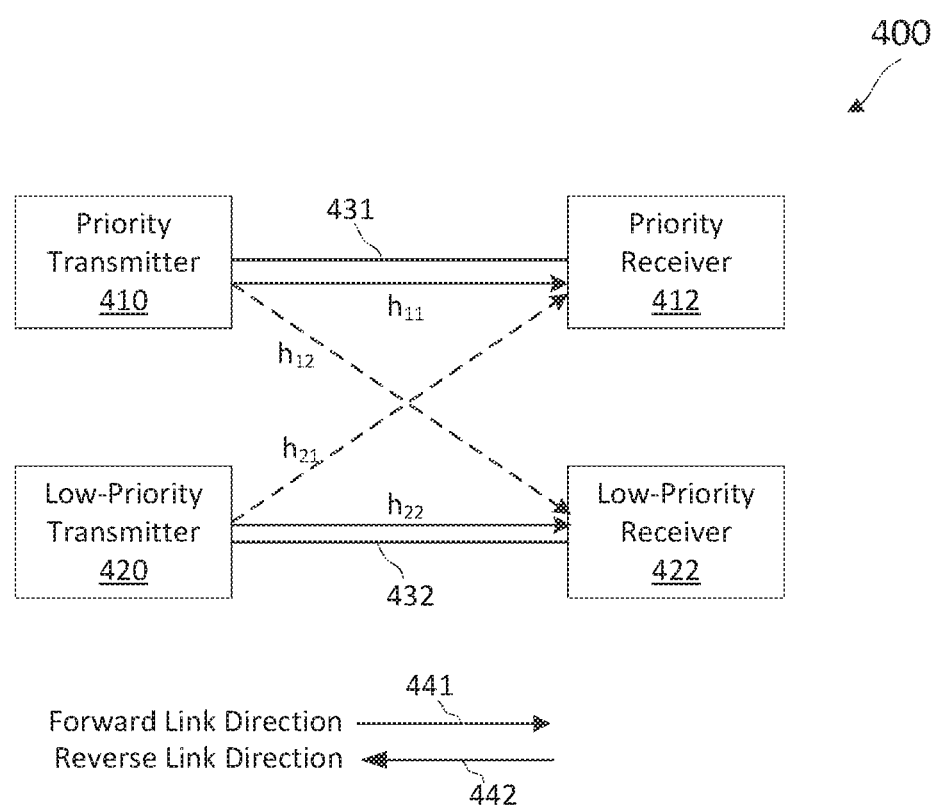
FIG. 4 illustrates an interference management scheme according to embodiments of the present disclosure.

FIG. 4 illustrates an interference management scheme 400 according to embodiments of the present disclosure. The scheme 400 may be employed by the UEs 115 and 215 for sidelink communications based on the structure of the subframe 300. FIG. 4 illustrates two links 431 and 432 for purposes of simplicity of discussion, though it will be recognized that embodiments of the present disclosure may scale to many more links 431 and 432. The priorities of the links 431 and 432 may be pre-determined for a particular sidelink period 332 or dynamically determined for each sidelink period 332. As an example, the link 431 has priority over the link 432 in a particular sidelink period 332. As shown, a priority transmitter 410 is in communication with a priority receiver 412 over the priority link 431, and a low-priority transmitter 420 is in communication with a low-priority receiver 422 over the low-priority link 432. For example, the priority link 431 may correspond to the link 251, and the low-priority link 252 may correspond to the link 252. The priority transmitter 410 may correspond to the UE 215a, and the priority receiver 412 may correspond to the UE 215b. The low-priority transmitter 420 may correspond to the UE 215c, and the low-priority receiver 422 may correspond to the UE 215d.

The scheme 400 manages interference in a forward link direction 441 and may apply medium access yielding based on channel measurements. For example, the direct channel from the priority transmitter 410 to the priority receiver 412 over the link 431 is represented by $h_{11}$. The direct channel from the low-priority transmitter 420 to the low-priority receiver 422 over the link 432 is represented by $h_{22}$. The cross-channel from the priority transmitter 410 to the low-priority receiver 422 is represented by $h_{12}$. The cross-channel from the low-priority transmitter 420 to the priority receiver 412 is represented by $h_{21}$. The cross-channels $h_{12}$ and $h_{21}$ determine the amount of interference between the links 431 and 432. Since the link 431 has priority over the link 432, the low-priority transmitter 420 and the low-priority receiver 422 may yield access to the priority transmitter 410 and the priority receiver 412. The yielding of access by the low-priority transmitter 420 is referred to as transmit (Tx)-yielding. The yielding of access by the low-priority receiver 422 is referred to as receive (Rx)-yielding.

To allow for a higher resource utilization efficiency or guaranteed quality-of-service (QOS)-channel reuse, the scheme 400 may allow simultaneous data transmissions over the priority link 431 and the low-priority link 432 when the cross-channel interference is weak or tolerable (e.g., without impacting performance). The data transmission over the low-priority link 432 may be based on an Rx-yielding determination by the low-priority receiver 422 and/or a Tx-yielding determination by the low-priority transmitter 420.

The low-priority receiver 422 may determine to yield access when the priority transmitter 410 can cause significant or noticeable interference to the low-priority receiver 422 over the cross-channel $h_{12}$. The low-priority receiver 422 may determine the cross-channel $h_{12}$ interference based on a RTS signal received from the priority transmitter 410, as described in greater detail herein. The low-priority transmitter 420 may determine to yield access when the low-priority transmitter 420 can cause noticeable or significant interference to the priority receiver 412 over the cross-channel $h_{21}$. The low-priority transmitter 420 may determine the cross-channel $h_{21}$ interference based on a CTS signal received from the priority receiver 412, as described in greater detail herein.

Figure 5:
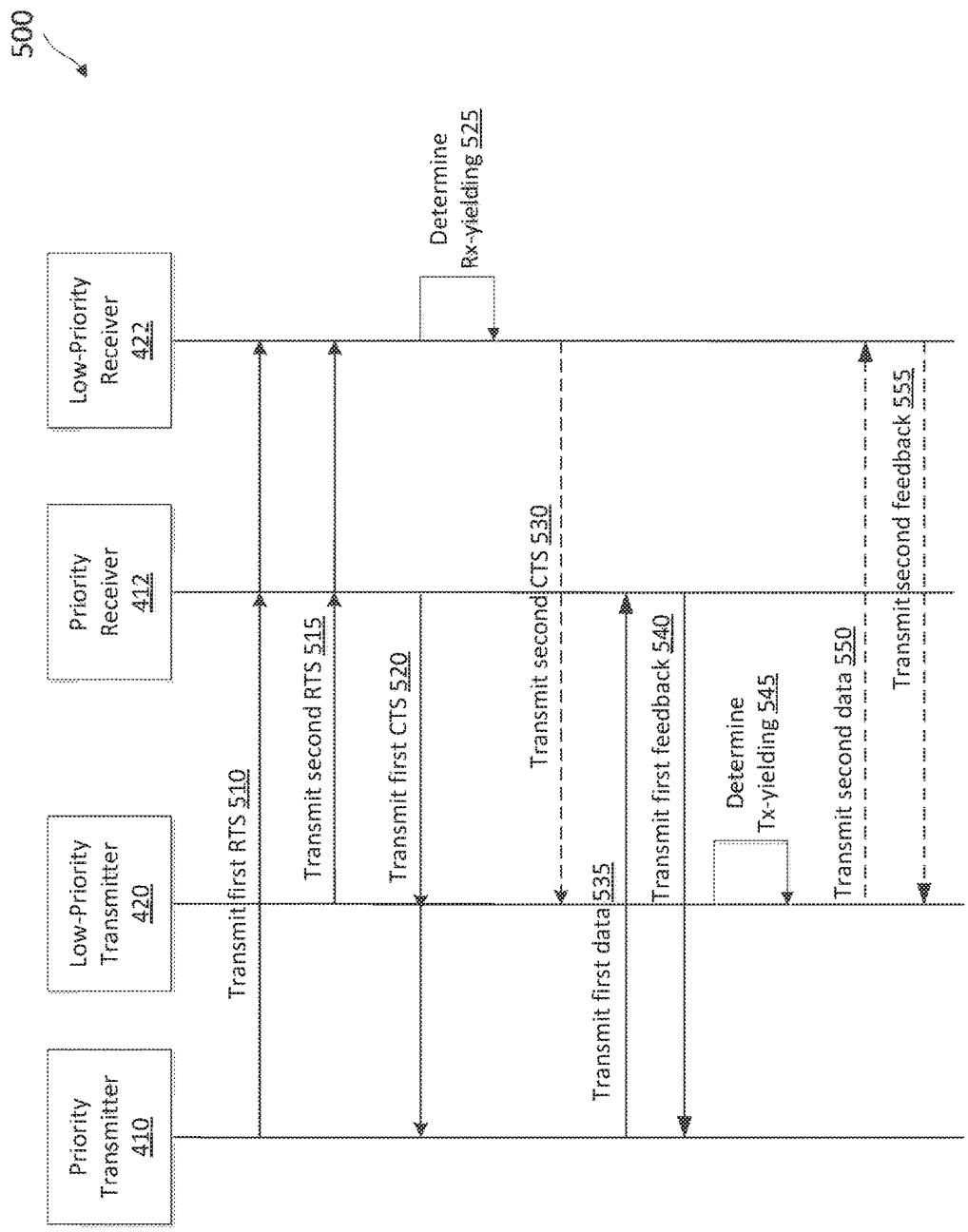
FIG. 5 illustrates a signaling diagram of a sidelink communication method according to embodiments of the present disclosure.

FIG. 5 illustrates a signaling diagram of a sidelink communication method 500 according to embodiments of the present disclosure. The method 500 is implemented by the priority transmitter 410, the low-priority transmitter 420, the priority receiver 412, and the low-priority receiver 422. The method 500 may employ similar yielding mechanisms as in the schemes 400 described with respect to FIG. 4 and may be based on the frame structure of the subframe 300 described with respect to FIG. 3. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 510, the priority transmitter 410 transmits a first RTS signal requesting a first forward data transmission to the priority receiver 412. At step 515, the low-priority transmitter 420 transmits a second RTS signal requesting a second forward data transmission to the low-priority receiver 422. The first RTS signal and the second RTS signal can be transmitted in the channel sensing period 334 via TDM (shown in FIG. 3) or FDM. The first forward data transmission and the second forward data transmission are requested for the sidelink regular burst period 326.

At step 520, in response to the first RTS signal, the priority receiver 412 transmits a first CTS signal to grant the first forward data transmission. In an embodiment, the priority receiver 412 may measure the received power of the second RTS signal to determine whether the low-priority transmitter 420 can cause interference (e.g., over the cross-channel $h_{21}$) to the priority receiver 412. The priority receiver 412 may indicate the interference status in the first CTS signal, for example, via a flag.

At step 525, upon receiving the first RTS signal and the second RTS signal, the low-priority receiver 422 determines whether to yield access (e.g., Rx-yielding). The low-priority receiver 422 may measure the receive power of the first RTS signal to determine whether the priority transmitter 410 can cause noticeable or significant interference (e.g., over the cross channel $h_{12}$) to the low-priority receiver 422, for example, based on a predetermined threshold. When the interference from the priority transmitter is strong, the low-priority receiver 422 may refrain from responding to the second RTS signal. However, when the interference from the priority transmitter 410 is weak, tolerable, or non-detectable, at step 530, the low-priority receiver 422 may transmit a second CTS signal to grant the second forward data transmission. The first CTS signal and the second CTS signal can be transmitted via FDM or TDM in the channel sensing period 334.

At step 535, the priority transmitter 410 transmits first data to the priority receiver 412 during the sidelink regular burst period 326. At step 540, the priority receiver 412 transmits a first feedback to the priority transmitter 410 during a sidelink feedback period 328. The first feedback may indicate an ACK when the reception of the first data is successful. Alternatively, the first feedback may indicate a NAK when the reception of the first data is unsuccessful.

At step 545, the low-priority transmitter 420 determines whether to yield access (e.g., Tx-yielding). For example, the low-priority transmitter 420 may obtain information associated with the cross-channel $h_{21}$ interference from the first CTS signal. When the low-priority transmitter 420 can cause strong interference to the priority receiver 412, the low-priority transmitter 420 may refrain from proceeding with the second forward data transmission. However, when the interference is weak, at step 550, the low-priority transmitter 420 may transmit second data to the low-priority receiver 422 during the sidelink regular burst period at step 550. At step 555, the low-priority receiver 422 transmits a second feedback to the low-priority transmitter 410. The second feedback can indicate an ACK or a NAK. The first data from the priority transmitter 410 and the second data from the low-priority transmitter 420 are transmitted simultaneously. Similarly, the first feedback from the priority receiver 412 and the second feedback from the low-priority receiver 422 are transmitted simultaneously.

As can be seen, the Tx-yielding and the Rx-yielding account for interference in the forward link direction 441, for example, from the low-priority transmitter 420 to the priority receiver 412 and/or from the priority transmitter 410 to the low-priority receiver 422. However, the simultaneous transmissions of the first feedback and the second feedback in the reverse link direction 442 can also interfere with each other.

Figure 6:
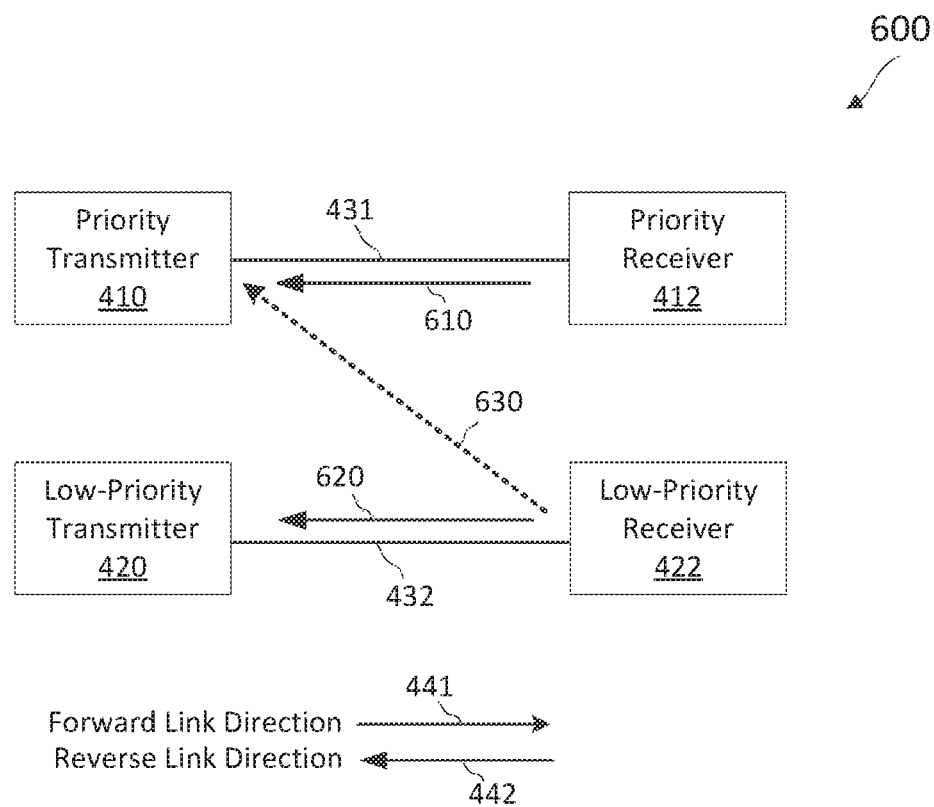
FIG. 6 illustrates an improved interference management with feedback transmission protection according to embodiments of the present disclosure.

FIG. 6 illustrates an improved interference management scheme 600 with feedback transmission protection according to embodiments of the present disclosure. The scheme 600 may be employed by the UEs 115 and 215 for sidelink communications based on the structure of the subframe 300. The scheme 600 considers interference in the reverse link direction 442 for Rx-yielding in addition to the interference in the forward link direction 441. In the scheme 600, the priority transmitter 410, the priority receiver 412, the low-priority transmitter 420, and the low-priority receiver 422 may have similar communication channels $h_{11}$, $h_{12}$, $h_{22}$, and $h_{21}$ as in the scheme 400. The scheme 600 may account for the interference in the forward link direction 441 using similar mechanisms as described in the scheme 400 and the method 500.

As shown, the priority receiver 412 transmits an ACK/NAK feedback 610 (e.g., the first feedback in the method 500) to the priority transmitter 410, for example, in response to data (e.g., the first data in the method 500) received from the priority transmitter 410. Similarly, the low-priority receiver 422 transmits an ACK/NAK feedback 620 (e.g., the second feedback in the method 500) to the low-priority transmitter 420, for example, in response to data (e.g., the second data in the method 500) received from the low-priority transmitter 420. The ACK/NAK feedback 620 can cause interference 630 on the priority transmitter 410. However, the priority transmitter 410 may have a certain level of interference tolerance. The interference tolerance level of the priority transmitter 410 can be represented by L1. The level of the interference 630 can be represented by L2.

As an example, the priority transmitter 410 can tolerate an interference level of about 5 decibels (dB). When the ACK/NAK feedback 620 causes less than 5 dB of interference 630, the interference 630 does not cause noticeable degradation to the reception of the ACK/NAK feedback 610. Thus, the low-priority receiver 422 can determine whether to yield based on L1 and L2. For example, when L1 is less than L2, the low-priority receiver 422 may yield. Conversely, when L1 is greater than or equal to L2, the low-priority receiver 422 may not be required to yield. As such, the scheme 600 can protect feedback transmissions in the reverse link direction 442 in addition to forward data transmissions in the forward link direction 441. In some embodiments, the values of L1 and/or L2 may be pre-determined and communicated to or pre-configured at the priority transmitter 410, the priority receiver 412, the low-priority transmitter 420, and/or the low-priority receiver 422. In some embodiments, the values of L1 and/or L2 may be dynamically determined, as described in greater detail herein.

Figure 7:
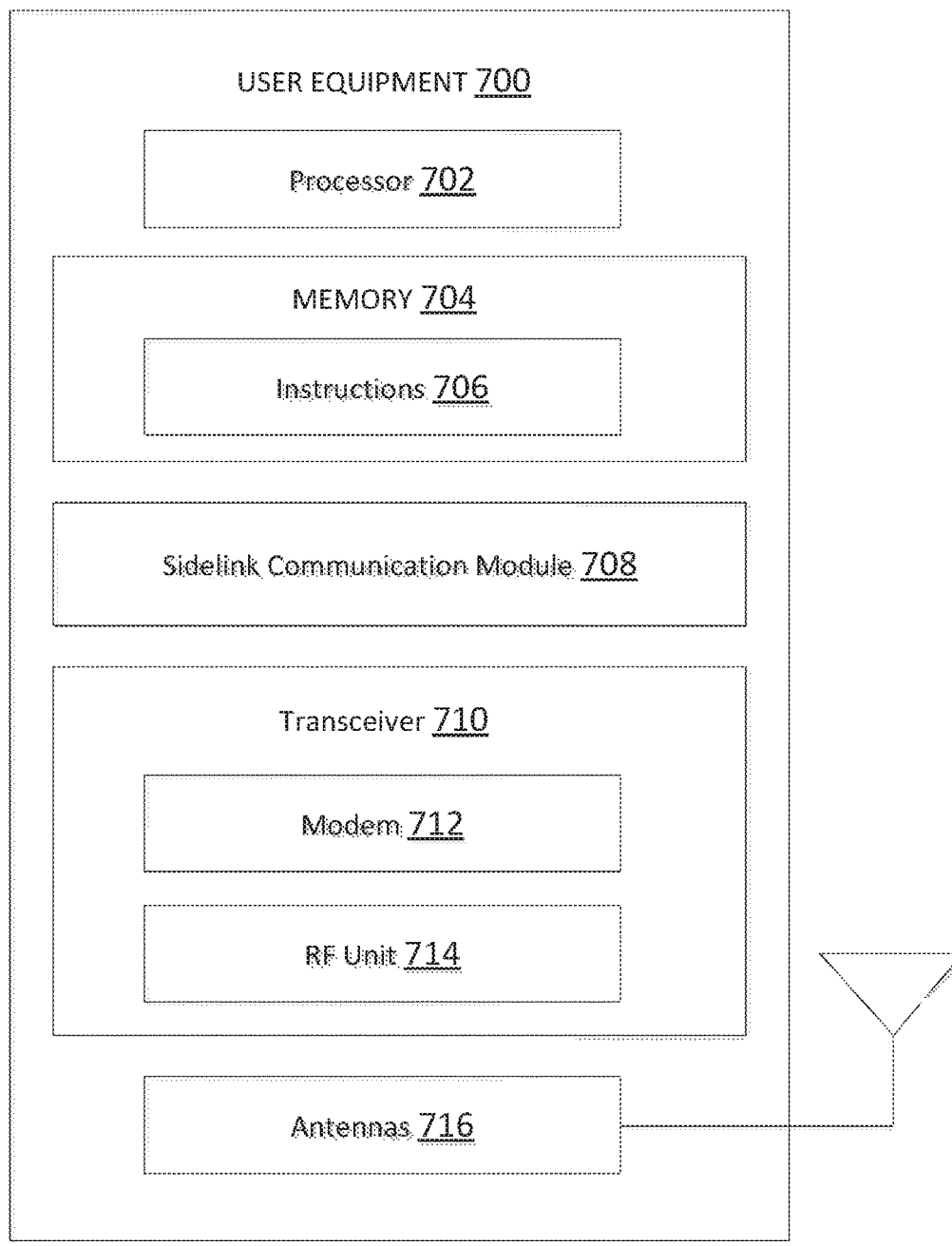
FIG. 7 is a block diagram of an exemplary user equipment (UE) according to embodiments of the present disclosure.

FIG. 7 is a block diagram of an exemplary UE 700 according to embodiments of the present disclosure. The UE 700 may be a UE 115 or 215 as discussed above. As shown, the UE 700 may include a processor 702, a memory 704, a sidelink communication module 708, a transceiver 710 including a modem subsystem 712 and a radio frequency (RF) unit 714, and an antenna 716. These elements may be in direct or indirect communication with each other, for example via one or more buses or other communication medium.

The processor 702 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 704 includes a non-transitory computer-readable medium. The memory 704 may store instructions 706. The instructions 706 may include instructions that, when executed by the processor 702, cause the processor 702 to perform the operations described herein with reference to the UEs 215 in connection with embodiments of the present disclosure. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 708 may be implemented via hardware, software, or combinations thereof. For example, the sidelink communication module 708 may be implemented as a processor, circuit, and/or instructions 706 stored in the memory 704 and executed by the processor 702. The sidelink communication module 708 may be used for various aspects of the present disclosure. For example, the sidelink communication module 708 is configured to identify sidelink resources (e.g., the sidelink period 332), perform network listening, estimate channels (e.g., $h_{11}$, $h_{12}$, $h_{22}$, and $h_{21}$), estimate interference tolerance level (e.g., L1), estimate feedback interference level (e.g., L2), and/or determine Tx-yielding and/or Rx-yielding to protect forward data transmissions (e.g., in the forward link direction 441) and feedback transmissions (e.g., in the reverse link direction 442) over sidelinks (e.g., the sidelinks 251 and 252), as described in greater detail herein.

As shown, the transceiver 710 may include the modem subsystem 712 and the RF unit 714. The transceiver 710 can be configured to communicate bi-directionally with other devices, such as the BSs 105 and 205. The modem subsystem 712 may be configured to modulate and/or encode the data from the memory 704 and/or the sidelink communication module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 215 or a BS 205. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 215 to enable the UE 215 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of RTS and/or CTS signals according to embodiments of the present disclosure. The antenna 716 may further receive data messages transmitted from other devices. This may include, for example, reception of RTS and/or CTS signals according to embodiments of the present disclosure. The antenna 716 may provide the received data messages for processing and/or demodulation at the transceiver 710. Although FIG. 7 illustrates antenna 716 as a single antenna, antenna 716 may include multiple antennas of similar or different designs in order to sustain multiple transmission links. The RF unit 714 may configure the antenna 716.

Figure 8:
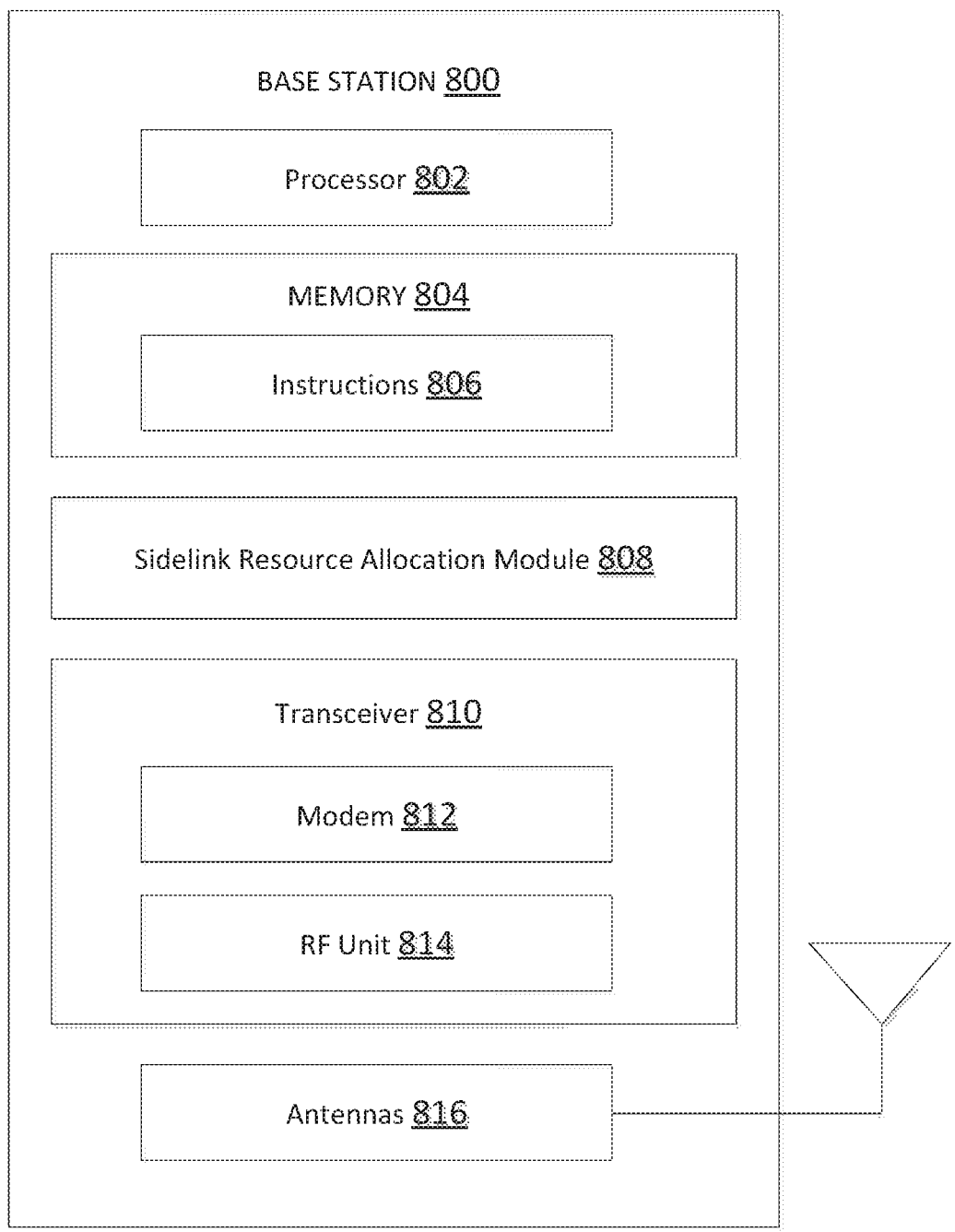
FIG. 8 is a block diagram of an exemplary base station (BS) according to embodiments of the present disclosure.

FIG. 8 is a block diagram of an exemplary BS 800 according to embodiments of the present disclosure. The BS 800 may be a BS 105 or 205 as discussed above. A shown, the BS 800 may include a processor 802, a memory 804, a sidelink resource allocation module 808, a transceiver 810 including a modem subsystem 812 and a RF unit 814, and an antenna 816. These elements may be in direct or indirect communication with each other, for example via one or more buses or other communication medium.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 804 may include a non-transitory computer-readable medium. The memory 804 may store instructions 806. The instructions 806 may include instructions that, when executed by the processor 802, cause the processor 802 to perform operations described herein. Instructions 806 may also be referred to as code, which may be interpreted broadly to include any type of computer-readable statement(s) as discussed above with respect to FIG. 8.

The sidelink resource allocation module 808 may be implemented via hardware, software, or combinations thereof. For example, the sidelink resource allocation module 808 may be implemented as a processor, circuit, and/or instructions 806 stored in the memory 804 and executed by the processor 802. The sidelink resource allocation module 808 may be used for various aspects of the present disclosure. For example, the sidelink resource allocation module 808 is configured to allocate sidelink resources (e.g., the sidelink period 332), determine sidelink transmission grants, and/or generate DL control information based on sidelink resource allocation and scheduling, as described in greater detail herein.

As shown, the transceiver 810 may include the modem subsystem 812 and the RF unit 814. The transceiver 810 can be configured to communicate bi-directionally with other devices, such as the UEs 115 and 215 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 215. The RF unit 814 may be further configured to perform analog beamforming in conjunction with the digital beamforming. Although shown as integrated together in transceiver 810, the modem subsystem 812 and the RF unit 814 may be separate devices that are coupled together at the BS 205 to enable the BS 205 to communicate with other devices.

The RF unit 814 may provide the modulated and/or processed data, e.g. data packets (or, more generally, data messages that may contain one or more data packets and other information), to the antenna 816 for transmission to one or more other devices. This may include, for example, transmission of information to complete attachment to a network and communication with a camped UE 215 according to embodiments of the present disclosure. The antenna 816 may further receive data messages transmitted from other devices and provide the received data messages for processing and/or demodulation at the transceiver 810. Although FIG. 8 illustrates antenna 816 as a single antenna, antenna 816 may include multiple antennas of similar or different designs in order to sustain multiple transmission links.

Figure 9:
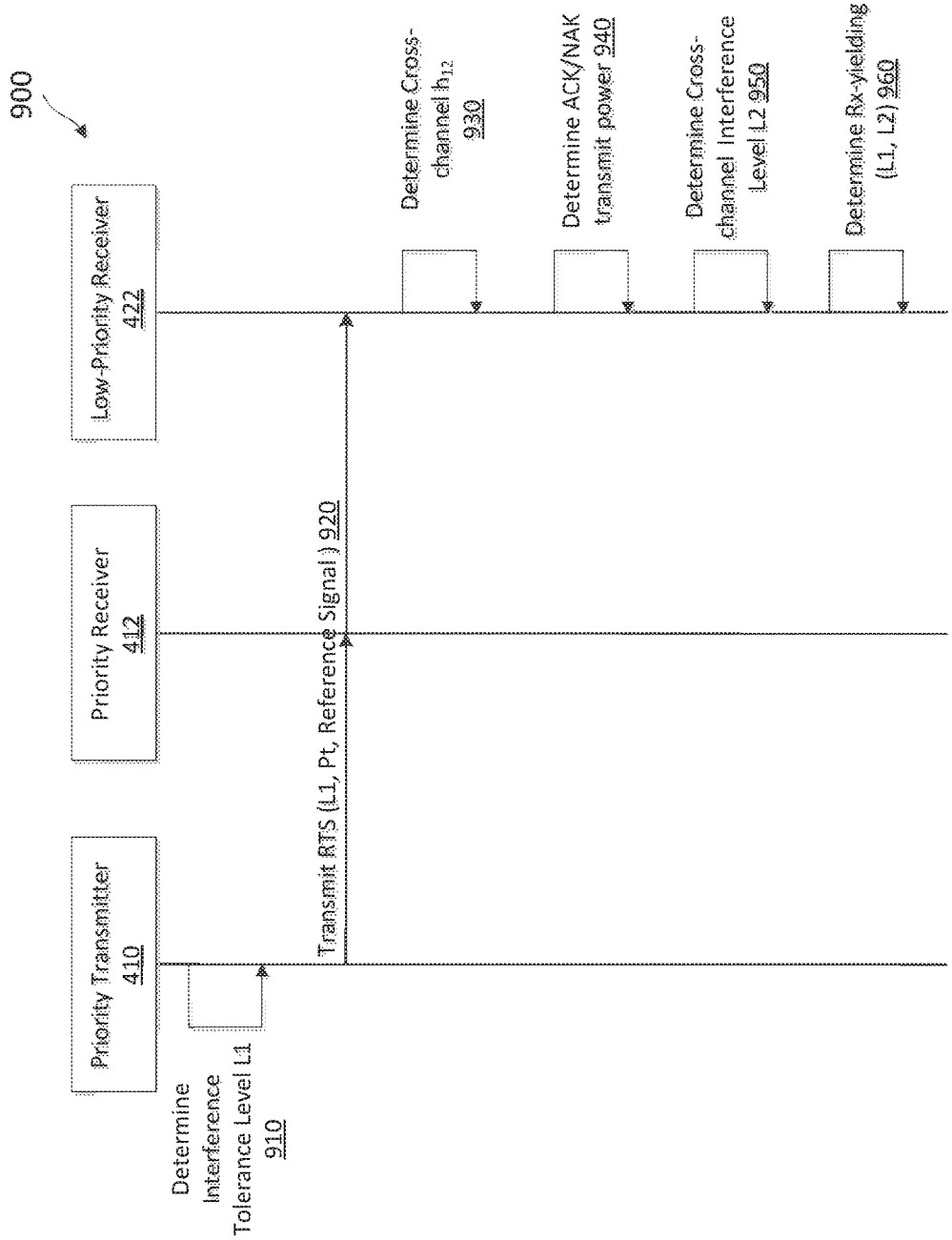
FIG. 9 is a signaling diagram of a feedback interference management method with feedback transmission protection according to embodiments of the present disclosure.

FIG. 9 illustrates a signaling diagram of an interference management method 900 with feedback transmission protection according to embodiments of the present disclosure. Steps of the method 900 can be executed by a computing device (e.g., a processor, processing circuit, and/or other suitable component) of a wireless communication device, such as the UEs 115, 215, and 700. The method 900 may employ similar mechanisms as in the scheme 600 described with respect to FIG. 6. The method 900 may be employed in conjunction with the scheme 400 and the method 500. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the priority transmitter 410 determines an interference tolerance level L1. For example, the priority transmitter 410 may collect and store receive power of ACK/NAK feedbacks (e.g., the ACK/NAK feedback 610) from a priority receiver (e.g., the priority receiver 412). In addition, the priority transmitter 410 may estimate noise over the channel from the received ACK/NAK feedbacks. The priority transmitter 410 may determine the interference tolerance level L1 based on the receive power, the noise power, and the required SINR for decoding ACK/NAK feedbacks as shown below in a linear scale:

$$X=S/(N+L1) \quad (1)$$

where X represents the required SINR, S represents the received power of the ACK/NAK feedbacks, and N represents the noise power.

At step 920, the priority transmitter 410 transmits a RTS signal requesting a forward data transmission to the priority receiver 412. The RTS signal may include an address or an ID of the priority receiver 420 and various signals and/or parameters to facilitate channel estimations and interference management. For example, the RTS signal may include the interference tolerance level L1, a transmit power, denoted as $P_t$, of the RTS signal, and a reference signal. The reference signal may be a pre-determined sequence that facilitates RTS signal detection and channel estimation.

At step 930, upon detecting the RTS signal, the low-priority receiver 422 determines a channel estimate of the forward cross-channel (e.g., $h_{12}$) from the priority transmitter 410 to the low-priority receiver 422, for example, based on at least the reference sequence and the transmit power $P_t$.

At step 940, the low-priority receiver 422 determines a transmit power, denoted as $P_r$, for transmitting an ACK/NAK feedback (e.g., the ACK/NAK feedback 620), for example, based on at least the receive power of the RTS signal. In an embodiment, the transmit power $P_r$ can be an inverse of the receive RTS power.

At step 950, the low-priority receiver 422 may determine a cross-channel interference level L2 of an ACK/NAK feedback transmission, for example, based on at least the transmit power $P_r$ and the channel estimate.

At step 960, the low-priority receiver 422 determines whether to yield based on at least L1, L2, and the receive power of the RTS signal. As described above, when L1 is less than L2, the low-priority receiver 422 may yield access to protect a feedback transmission of the priority receiver 420. When the receive power of the RTS signal is strong and may cause interference to the low-priority receiver 422, the low-priority receiver 422 may also yield access to protect a forward data transmission of the priority transmitter 410.

Figure 10:
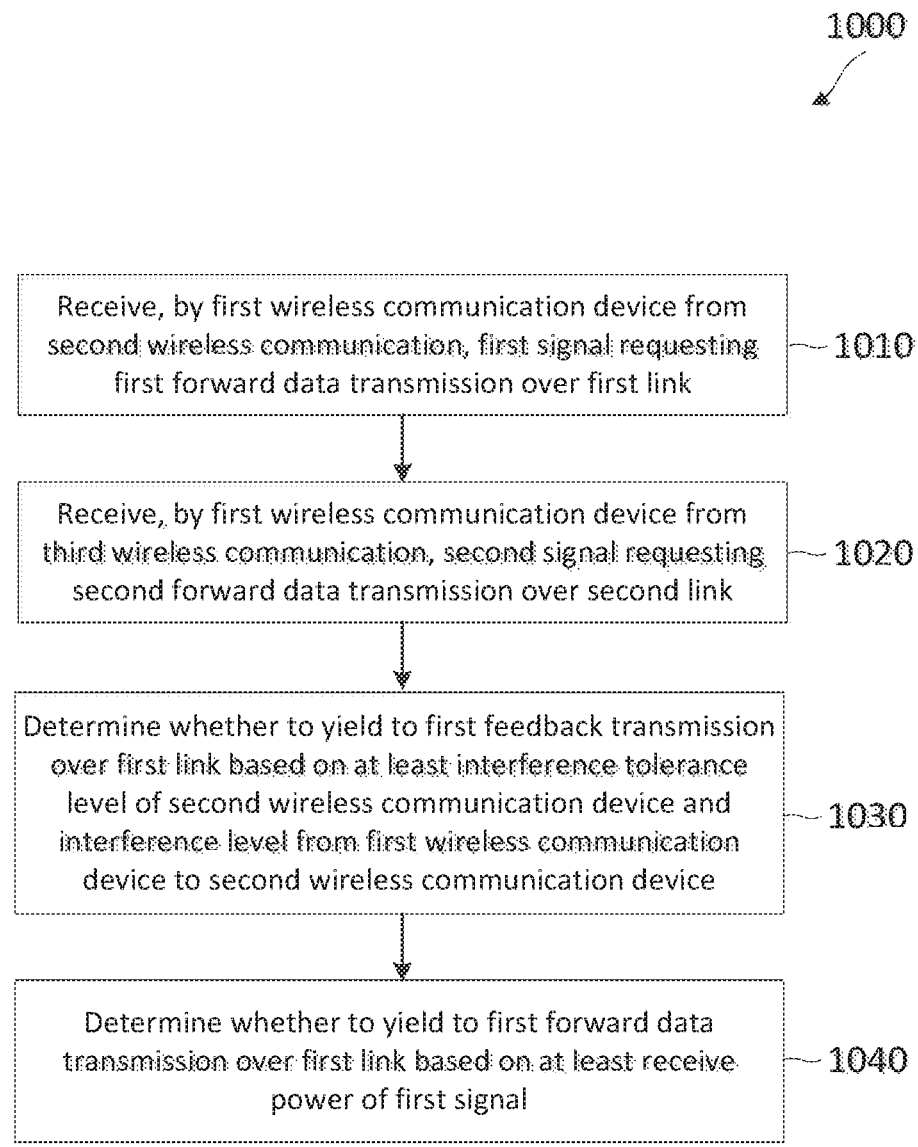
FIG. 10 is a flow diagram of a feedback in interference management method with feedback transmission protection according to embodiments of the present disclosure.

FIG. 10 is a flow diagram of a feedback in interference management method 1000 with feedback transmission protection according to embodiments of the present disclosure. Steps of the method 1000 can be executed by a computing device (e.g., a processor, processing circuit, and/or other suitable component) of a wireless communication device, such as the UEs 115, 215, and 700. The method 1000 may employ similar mechanisms as in the schemes 400 and 600 and the methods 500 and 900 described with respect to FIGS. 4, 6, 5, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving, by a first wireless communication device (e.g., the low-priority receiver 422) from a second wireless communication device (e.g., the priority transmitter 410), a first signal requesting a first forward data transmission over a first link (e.g., the link 431).

At step 1020, the method 1000 includes receiving, by the first wireless communication device from a third wireless communication device (e.g., the low-priority transmitter 420), a second signal requesting a second forward data transmission over a second link (e.g., the link 432).

At step 1030, the method 1000 includes determining, by the first wireless communication device, whether to yield to a first feedback transmission (e.g., the ACK/NAK feedback 610) over the first link based on at least an interference tolerance level (e.g., L1) of the second wireless communication device and an interference level (e.g., L2) of from the first wireless communication device to the second wireless communication device. The first feedback transmission may be an ACK or NAK response to the first forward data transmission. For example, when L1 is less than or equal L2, the first wireless communication device may yield to the first feedback transmission by refraining from responding to the second signal. Alternatively, when L1 is greater or equal to L2, the first wireless communication may not yield to the first feedback transmission, for example, by responding to the second signal.

At step 1040, the method 1000 includes determining, by the first wireless communication device, whether to yield to the first forward data transmission based on at least a receiver power of the first signal. The determination of yielding to the first forward data transmission and the first feedback transmission is dependent on both steps 1030 and 1040. When the first wireless communication device determines that either yielding to the first forward data transmission or the first feedback transmission is required, the first wireless communication device may refrain from responding to the seconds signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication including receiving, by a first wireless communication device from a second wireless communication device, a first forward data transmission request signal over a first link in a first link direction, wherein the first forward data transmission request signal is associated with a first feedback transmission over the first link in a second link direction opposite the first link direction; and yielding, by the first wireless communication device in response to the first forward data transmission request signal, access to a channel resource for the first feedback transmission based on at least an interference tolerance level of the second wireless communication device and an interference level on the first feedback transmission from the first wireless communication device.

The method further includes receiving, by the first wireless communication device from a third wireless communication device, a second forward data transmission request signal over a second link. The method further includes wherein the first link has priority over the second link in a time period, wherein the yielding includes yielding access to the channel resource for the first feedback transmission during the time period. Accordingly, in some instances, the method further includes identifying that the first link has priority over the second link in a time period, and yielding the access during the time period The method further includes wherein the yielding includes determining that the interference tolerance level is less than or equal the interference level; and refraining from transmitting a response signal to the second forward data transmission request signal. The method further includes determining, by the first wireless communication device, a channel estimate associated with the first wireless communication device and the second wireless communication device based on at least the first forward data transmission request signal; determining, by the first wireless communication device, a transmit power for a second feedback transmission associated with the second forward data transmission request signal based on at least the first forward data transmission request signal; and determining the interference level based on at least the channel estimate and the transmit power for the second feedback transmission. The method further includes wherein the first forward data transmission request signal includes a reference signal, and wherein the channel estimate is further determined based on at least the reference signal. The method further includes wherein the first forward data transmission request signal includes a transmit power of the first forward data transmission request signal, and wherein the channel estimate is further determined based on at least the transmit power of the first forward data transmission request signal. The method further includes wherein the transmit power of the second feedback transmission is further determined based on at least a receive power of the first forward data transmission request signal. The method further includes wherein the transmit power of the second feedback transmission is further determined based on at least an inverse of the receive power of the first forward data transmission request signal. The method further includes wherein the first forward data transmission request signal includes the interference tolerance level of the second wireless communication device. The method further includes receiving, by the first wireless communication device, a configuration indicating the interference tolerance level of the second wireless communication device. The method further includes receiving, by the first wireless communication device, a configuration indicating the interference level from the first wireless communication device to the second wireless communication device. The method further includes wherein the yielding is further based on at least a receive power of the first signal. The method further includes receiving, by the first wireless communication device from a third wireless communication device, one or more feedback signals associated with one or more forward data transmissions of the first wireless communication devices; determining, by the first wireless communication device, an interference tolerance level of the first wireless communication device based on at least one or more receive powers of the one or more feedback signals; and transmitting, by the first wireless communication device, a second signal requesting another forward data transmission, wherein the second signal includes the interference tolerance level of the first wireless communication device.

Embodiments of the present disclosure include an apparatus including a receiver configured to receive, from a second wireless communication device, a first forward data transmission request signal over a first link in a first link direction, wherein the first forward data transmission request signal is associated with a first feedback transmission over the first link in a second link direction opposite the first link direction; and processor configured to yield, in response to the first forward data transmission request signal, access to a channel resource for the first feedback transmission based on at least an interference tolerance level of the second wireless communication device and an interference level on the first feedback transmission from the first wireless communication device.

The apparatus further includes wherein the receiver is further configured to receive, from a third wireless communication device, a second forward data transmission request signal over a second link. The apparatus further includes wherein the first link has priority over the second link in a time period, and wherein the processor is further configured to yield the access to the channel resource by yielding access to the channel resource for the first feedback transmission during the time period. The apparatus further includes wherein the processor is further configured to yield the access to the channel resource by determining that the interference tolerance level is less than or equal the interference level; and refraining from transmitting a response signal to the second forward data transmission request signal. The apparatus further includes wherein the processor is further configured to determine a channel estimate associated with the first wireless communication device and the second wireless communication device based on at least the first forward data transmission request signal; determine a transmit power for a second feedback transmission associated with the second forward data transmission request signal based on at least the first forward data transmission request signal; and determine the interference level based on at least the channel estimate and the transmit power for the second feedback transmission. The apparatus further includes wherein the first forward data transmission request signal includes a reference signal, and wherein the processor is further configured to determine the channel estimate based on at least the reference signal. The apparatus further includes wherein the first forward data transmission request signal includes a transmit power of the first forward data transmission request signal, and wherein the processor is further configured to determine the channel estimate based on at least the transmit power of the first forward data transmission request signal. The apparatus further includes wherein the processor is further configured to determine the transmit power of the second feedback transmission based on at least a receive power of the first forward data transmission request signal. The apparatus further includes wherein the processor is further configured to determine the transmit power of the second feedback transmission based on at least an inverse of the receive power of the first forward data transmission request signal. The apparatus further includes wherein the first forward data transmission request signal includes the interference tolerance level of the second wireless communication device. The apparatus further includes wherein the receiver is further configured to receive a configuration indicating the interference tolerance level of the second wireless communication device. The apparatus further includes wherein the receiver is further configured to receive a configuration indicating the interference level from the first wireless communication device to the second wireless communication device. The apparatus further includes wherein the processor is further configured to yield the access to the channel based on at least a receive power of the first signal. The apparatus further includes wherein the receiver is further configured to receive, from a third wireless communication device, one or more feedback signals associated with one or more forward data transmissions of the first wireless communication devices, wherein the processor is further configured to determine an interference tolerance level of the first wireless communication device based on at least one or more receive powers of the one or more feedback signals, wherein the apparatus further comprises a transmitter configured to transmit a second signal requesting another forward data transmission, and wherein the second signal includes the interference tolerance level of the first wireless communication device.

Embodiments of the present disclosure include a computer-readable medium having program code recorded thereon, the program code including code for causing a first wireless communication device to receive, from a second wireless communication device, a first forward data transmission request signal over a first link in a first link direction, wherein the first forward data transmission request signal is associated with a first feedback transmission over the first link in a second link direction opposite the first link direction; and code for causing the first wireless communication device to yield, in response to the first forward data transmission request signal, access to a channel resource for the first feedback transmission based on at least an interference tolerance level of the second wireless communication device and an interference level on the first feedback transmission from the first wireless communication device.

The computer-readable medium further includes code for causing the first wireless communication device to receive, from a third wireless communication device, a second forward data transmission request signal over a second link. The computer-readable medium further wherein the first link has priority over the second link in a time period, and wherein the code for causing the first wireless communication device to yield is further configured to yield the access to the channel resource for the first feedback transmission during the time period. The computer-readable medium further includes wherein the code for causing the first wireless communication device to yield is further configured to determine that the interference tolerance level is less than or equal the interference level; and refrain from transmitting a response signal to the second forward data transmission request signal. The computer-readable medium further includes code for causing the first wireless communication device to determine a channel estimate associated with the first wireless communication device and the second wireless communication device based on at least the first forward data transmission request signal; code for causing the first wireless communication device to determine a transmit power for a second feedback transmission associated with the second forward data transmission request signal based on at least the first forward data transmission request signal; and code for causing the first wireless communication device to determine the interference level based on at least the channel estimate and the transmit power for the second feedback transmission. The computer-readable medium further includes wherein the first forward data transmission request signal includes a reference signal, and wherein the code for causing the first wireless communication device to determine the channel estimate is further configured to determine the channel estimate based on at least the reference signal. The computer-readable medium further includes wherein the first forward data transmission request signal includes a transmit power of the first forward data transmission request signal, and wherein the code for causing the first wireless communication device to determine the channel estimate is further configured to determine the channel estimate based on at least the transmit power of the first forward data transmission request signal. The computer-readable medium further includes wherein the code for causing the first wireless communication device to determine the transmit power of the second feedback transmission is further to determine the transmit power of the second feedback transmission based on at least a receive power of the first forward data transmission request signal. The computer-readable medium further includes wherein the code for causing the first wireless communication device to determine the transmit power of the second feedback transmission is further to determine the transmit power of the second feedback transmission based on at least an inverse of the receive power of the first forward data transmission request signal. The computer-readable medium further includes wherein the first forward data transmission request signal includes the interference tolerance level of the second wireless communication device. The computer-readable medium further includes code for causing the first wireless communication device to receive a configuration indicating the interference tolerance level of the second wireless communication device. The computer-readable medium further includes code for causing the first wireless communication device to receive a configuration indicating the interference level from the first wireless communication device to the second wireless communication device. The computer-readable medium further includes wherein the code for causing the first wireless communication device to yield the access to the channel resource is further configured to yield the access to the channel resource based on at least a receive power of the first signal. The computer-readable medium further includes code for causing the first wireless communication device to receive, from a third wireless communication device, one or more feedback signals associated with one or more forward data transmissions of the first wireless communication devices; code for causing the first wireless communication device to determine an interference tolerance level of the first wireless communication device based on at least one or more receive powers of the one or more feedback signals; and code for causing the first wireless communication device to transmit a second signal requesting another forward data transmission, wherein the second signal includes the interference tolerance level of the first wireless communication device.

Embodiments of the present disclosure include an apparatus including means for receiving, from a second wireless communication device, a first forward data transmission request signal over a first link in a first link direction, wherein the first forward data transmission request signal is associated with a first feedback transmission over the first link in a second link direction opposite the first link direction; and smeans for yielding, in response to the first forward data transmission request signal, access to a channel resource for the first feedback transmission based on at least an interference tolerance level of the second wireless communication device and an interference level on the first feedback transmission from the first wireless communication device.

The apparatus of claim further includes means for receiving, from a third wireless communication device, a second forward data transmission request signal over a second link. The apparatus of claim further includes wherein the first link has priority over the second link in a time period, and wherein the means for yielding the access to the channel resource is further configured to yield the access to the channel resource for the first feedback transmission during the time period. The apparatus of claim further includes wherein the means for yielding the access to the channel resource is further configured to determine that the interference tolerance level is less than or equal the interference level; and refrain from transmitting a response signal to the second forward data transmission request signal. The apparatus of claim further includes means for determining a channel estimate associated with the first wireless communication device and the second wireless communication device based on at least the first forward data transmission request signal; means for determining a transmit power for a second feedback transmission associated with the second forward data transmission request signal based on at least the first forward data transmission request signal; and means for determining the interference level based on at least the channel estimate and the transmit power for the second feedback transmission. The apparatus of claim further includes wherein the first forward data transmission request signal includes a reference signal, and wherein the means for determining the channel estimate is further configured to determine the channel estimate based on at least the reference signal. The apparatus of claim further includes wherein the first forward data transmission request signal includes a transmit power of the first forward data transmission request signal, and wherein the means for determining the channel estimate is further configured to determine the channel estimate based on at least the transmit power of the first forward data transmission request signal. The apparatus of claim further includes wherein the means for determining the transmit power of the second feedback transmission is further configured to determine the transmit power of the second feedback transmission based on at least a receive power of the first forward data transmission request signal. The apparatus of claim further includes wherein the means for determining the transmit power of the second feedback transmission is further configured to determine the transmit power of the second feedback transmission based on at least an inverse of the receive power of the first forward data transmission request signal. The apparatus of claim further includes wherein the first forward data transmission request signal includes the interference tolerance level of the second wireless communication device. The apparatus of claim further includes means for receiving a configuration indicating the interference tolerance level of the second wireless communication device. The apparatus of claim further includes means for receiving a configuration indicating the interference level from the first wireless communication device to the second wireless communication device. The apparatus of claim further includes wherein the means for yielding access to the channel resource is further configured to yield the access to the channel based on at least a receive power of the first signal. The apparatus of claim further includes means for receiving, from a third wireless communication device, one or more feedback signals associated with one or more forward data transmissions of the first wireless communication devices; means for determining an interference tolerance level of the first wireless communication device based on at least one or more receive powers of the one or more feedback signals; and means for transmitting a second signal requesting another forward data transmission, wherein the second signal includes the interference tolerance level of the first wireless communication device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device from a second wireless communication device, a first forward data transmission request signal requesting a first forward data transmission over a first link in a first link direction to a third wireless communication device, wherein the first forward data transmission is associated with a first feedback transmission from the third wireless communication device to the second wireless communication device over the first link in a second link direction opposite the first link direction; and
refraining, by the first wireless communication device in response to the first forward data transmission request signal, from communicating with a fourth wireless communication device to yield access to a channel resource for the first feedback transmission from the third wireless communication device based on at least an interference tolerance level of the second wireless communication device and an interference level on the first feedback transmission from the first wireless communication device, the fourth wireless communication device being different from the third wireless communication device.

2. The method of claim 1, further comprising receiving, by the first wireless communication device from the fourth wireless communication device, a second forward data transmission request signal over a second link.

3. The method of claim 2, further comprising:
identifying that the first link has priority over the second link in a time period; and
refraining from communicating with the fourth wireless communication device during the time period.

4. The method of claim 2, wherein the refraining from communicating with the fourth wireless communication device includes:
determining that the interference tolerance level is less than or equal the interference level; and
refraining from transmitting a response signal to the second forward data transmission request signal.

5. The method of claim 2, further comprising:
determining, by the first wireless communication device, a channel estimate associated with the first wireless communication device and the second wireless communication device based on at least the first forward data transmission request signal;
determining, by the first wireless communication device, a transmit power for a second feedback transmission associated with the second forward data transmission request signal based on at least the first forward data transmission request signal; and
determining the interference level based on at least the channel estimate and the transmit power for the second feedback transmission.

6. The method of claim 5, further comprising:
receiving the first forward data transmission request signal including a reference signal; and
determining the channel estimate further based on at least one of the reference signal, the transmit power of the first forward data transmission request signal, or a receive power of the first forward data transmission request signal.

7. The method of claim 1, further comprising receiving the first forward data transmission request signal including the interference tolerance level of the second wireless communication device.

8. The method of claim 1, further comprising, receiving, by the first wireless communication device, a configuration indicating at least one of the interference tolerance level of the second wireless communication device or the interference level from the first wireless communication device to the second wireless communication device.

9. The method of claim 1, wherein the refraining from communicating with the fourth wireless communication device is further based on at least a receive power of the first forward data transmission request signal.

10. The method of claim 1, further comprising:
receiving, by the first wireless communication device from a fifth wireless communication device, one or more feedback signals associated with one or more forward data transmissions of the first wireless communication device;
determining, by the first wireless communication device, an interference tolerance level of the first wireless communication device based on at least one or more receive powers of the one or more feedback signals; and
transmitting, by the first wireless communication device, a second signal requesting another forward data transmission, wherein the second signal includes the interference tolerance level of the first wireless communication device.

11. An apparatus comprising:
a receiver configured to receive, from a second wireless communication device, a first forward data transmission request signal requesting a first forward data transmission over a first link in a first link direction to a third wireless communication device, wherein the first forward data transmission is associated with a first feedback transmission from the third wireless communication device to the second wireless communication device over the first link in a second link direction opposite the first link direction; and
a processor configured to refrain, in response to the first forward data transmission request signal, from communicating with a fourth wireless communication device to yield access to a channel resource for the first feedback transmission from the third wireless communication device based on at least an interference tolerance level of the second wireless communication device and an interference level on the first feedback transmission from the apparatus, the fourth wireless communication device being different from the third wireless communication device.

12. The apparatus of claim 11, wherein the receiver is further configured to receive, from the fourth wireless communication device, a second forward data transmission request signal over a second link.

13. The apparatus of claim 12, wherein the first link has priority over the second link in a time period, and wherein the processor is further configured to refrain from communicating with the fourth wireless communication device during the time period.

14. The apparatus of claim 12, wherein the processor is further configured to refrain from communicating with the fourth wireless communication device by:
determining that the interference tolerance level is less than or equal the interference level; and
refraining from transmitting a response signal to the second forward data transmission request signal.

15. The apparatus of claim 12, wherein the processor is further configured to:

determine a channel estimate associated with the apparatus and the second wireless communication device based on at least the first forward data transmission request signal;

determine a transmit power for a second feedback transmission associated with the second forward data transmission request signal based on at least the first forward data transmission request signal; and determine the interference level based on at least the channel estimate and the transmit power for the second feedback transmission.

16. The apparatus of claim 15, wherein the first forward data transmission request signal includes a reference signal, and wherein the processor is further configured to determine the channel estimate based on at least one of the reference signal, the transmit power of the first forward data transmission request signal, or a receive power of the first forward data transmission request signal.

17. The apparatus of claim 11, wherein the first forward data transmission request signal includes the interference tolerance level of the second wireless communication device.

18. The apparatus of claim 11, wherein the receiver is further configured to receive a configuration indicating at least one of the interference tolerance level of the second wireless communication device or the interference level from the apparatus to the second wireless communication device.

19. The apparatus of claim 11, wherein the processor is further configured to refrain from communicating with the fourth wireless communication device further based on at least a receive power of the first forward data transmission request signal.

20. The apparatus of claim 11, wherein the receiver is further configured to receive, from a fifth wireless communication device, one or more feedback signals associated with one or more forward data transmissions of the apparatus, wherein the processor is further configured to determine an interference tolerance level of the apparatus based on at least one or more receive powers of the one or more feedback signals, wherein the apparatus further comprises a transmitter configured to transmit a second signal requesting another forward data transmission, and wherein the second signal includes the interference tolerance level of the apparatus.

21. A non-transitory computer-readable medium having program code recorded thereon, the program code comprising:

code for causing a first wireless communication device to receive, from a second wireless communication device, a first forward data transmission request signal requesting a first forward data transmission over a first link in a first link direction to a third wireless communication device, wherein the first forward data transmission is associated with a first feedback transmission from the third wireless communication device to the second wireless communication device over the first link in a second link direction opposite the first link direction; and code for causing the first wireless communication device to refrain, in response to the first forward data transmission request signal, from communicating with a fourth wireless communication device to yield access to a channel resource for the first feedback transmission from the third wireless communication device based on at least an interference tolerance level of the second wireless communication device and an interference level on the first feedback transmission from the first wireless communication device, the fourth wireless communication device being different from the third wireless communication device.

22. The non-transitory computer-readable medium of claim 21, further comprising code for causing the first wireless communication device to receive, from the fourth wireless communication device, a second forward data transmission request signal over a second link.

23. The non-transitory computer-readable medium of claim 22, wherein the first link has priority over the second link in a time period, and wherein the code for causing the first wireless communication device to refrain from communicating with the fourth wireless communication device is further configured to refrain from communicating with the fourth wireless communication device during the time period.

24. The non-transitory computer-readable medium of claim 22, wherein the code for causing the first wireless communication device to refrain from communicating with the fourth wireless communication device is further configured to:

determine that the interference tolerance level is less than or equal the interference level; and refrain from transmitting a response signal to the second forward data transmission request signal.

25. The non-transitory computer-readable medium of claim 22, further comprising:

code for causing the first wireless communication device to determine a channel estimate associated with the first wireless communication device and the second wireless communication device based on at least the first forward data transmission request signal;

code for causing the first wireless communication device to determine a transmit power for a second feedback transmission associated with the second forward data transmission request signal based on at least the first forward data transmission request signal; and code for causing the first wireless communication device to determine the interference level based on at least the channel estimate and the transmit power for the second feedback transmission.

26. The non-transitory computer-readable medium of claim 25, wherein the first forward data transmission request signal includes a reference signal, and wherein the code for causing the first wireless communication device to determine the channel estimate is further configured to determine the channel estimate based on at least one of the reference signal, the transmit power of the first forward data transmission request signal, or a receive power of the first forward data transmission request signal.

27. The non-transitory computer-readable medium of claim 21, wherein the first forward data transmission request signal includes the interference tolerance level of the second wireless communication device.

28. The non-transitory computer-readable medium of claim 21, further comprising code for causing the first wireless communication device to receive a configuration indicating at least one of the interference tolerance level of the second wireless communication device or the interference level from the first wireless communication device to the second wireless communication device.

29. The non-transitory computer-readable medium of claim 21, wherein the code for causing the first wireless communication device to refrain from communicating with the fourth wireless communication device is further configured to refrain from communicating with the fourth wireless communication device further based on at least a receive power of the first forward data transmission request signal.

30. The non-transitory computer-readable medium of claim 21, further comprising:
- code for causing the first wireless communication device to receive, from a fifth wireless communication device, one or more feedback signals associated with one or more forward data transmissions of the first wireless communication device;
- code for causing the first wireless communication device to determine an interference tolerance level of the first wireless communication device based on at least one or more receive powers of the one or more feedback signals; and
- code for causing the first wireless communication device to transmit a second signal requesting another forward data transmission, wherein the second signal includes the interference tolerance level of the first wireless communication device.

* * * * *